(12) United States Patent
Nojima

(10) Patent No.: US 9,230,583 B1
(45) Date of Patent: Jan. 5, 2016

(54) DISC DEVICE AND CONTROLLING METHOD

(71) Applicant: Kabushiki Kaisha Toshiba, Minato-Ku, Tokyo (JP)

(72) Inventor: Yusuke Nojima, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/683,308

(22) Filed: Apr. 10, 2015

Related U.S. Application Data

(60) Provisional application No. 62/096,696, filed on Dec. 24, 2014.

(51) Int. Cl.
*G11B 5/596* (2006.01)
(52) U.S. Cl.
CPC ...................... *G11B 5/596* (2013.01)
(58) Field of Classification Search
None
See application file for complete search history.

(56) References Cited

U.S. PATENT DOCUMENTS

| | | | |
|---|---|---|---|
| 6,101,058 A | 8/2000 | Morris | |
| 6,493,172 B1 | 12/2002 | Morris et al. | |
| 6,624,982 B2 | 9/2003 | Masuda et al. | |
| 6,697,211 B2 | 2/2004 | Koganezawa | |
| 6,972,924 B1 | 12/2005 | Chen et al. | |
| 7,009,803 B2 * | 3/2006 | Sharma ................. | G11B 5/596 360/77.02 |
| 2002/0171967 A1 | 11/2002 | Szita | |
| 2011/0141614 A1 | 6/2011 | Suzuki et al. | |

FOREIGN PATENT DOCUMENTS

| | | |
|---|---|---|
| JP | 2001-266517 A | 9/2001 |
| JP | 2002-124049 A | 4/2002 |
| JP | 3771076 B2 | 4/2006 |
| JP | 3771122 B2 | 4/2006 |
| JP | 2011-123960 A | 6/2011 |

* cited by examiner

*Primary Examiner* — K. Wong
(74) *Attorney, Agent, or Firm* — White & Case LLP

(57) ABSTRACT

According to an embodiment, there is provided a disc device that execute a filtering process to remove one or more resonances from the first signal by the sum of transfer functions, the one or more resonances being included in first transfer characteristics from the first signal transmitted via the first control line to response of the first head, the transfer functions being indicative of resonances included in second transfer characteristics from the first signal transmitted via the second control line to response of the first head.

14 Claims, 15 Drawing Sheets

— $P_{ba}(s)$

— $P_{ba}(s)$

— F(s)

— F(s)

DISC DEVICE AND CONTROLLING METHOD

CROSS-REFERENCE TO RELATED APPLICATIONS

This application is based upon and claims the benefit of priority from U.S. Provisional Application No. 62/096,696, filed on Dec. 24, 2014; the entire contents of which are incorporated herein by reference.

FIELD

Embodiments described herein relate generally to a disc device and a controlling method.

BACKGROUND

There is a disc device that includes arms equipped with head suspensions having actuators (so-called micro actuators (MA)) configured for precise movement of plurality of heads. There are techniques by which actuators for head corresponding to lower surface of a disc (hereinafter, referred to as UP head) and for head corresponding to upper surface of a disc (hereinafter, referred to as DN head) are driven in in-phase or reversed-phase directions, thereby to cancel out resonances of the arms.

However, all of the resonances cannot be canceled out by technique by which to drive the actuators for the UP heads and the DN heads in reversed-phase directions or by technique by which to drive the actuators for the UP heads and the DN heads in in-phase directions. All of the resonances cannot be canceled out by using either of techniques due to restrictions on the arms' frequency response characteristics.

DETAILED DESCRIPTION

In general, according to an embodiment, there is provided a disc device that includes a plurality of recording surfaces on a disc, a first head, a second head, a first actuator, a second actuator, a third actuator, a first control line, a second control line, and a filter. The first head is position-controlled over a first recording surface of the plurality of recording surfaces. The second head is position-controlled over a second recording surface other than the first recording surface of the plurality of recording surfaces. The first actuator drives the first head based on a first signal to position the first head at a target position of the recording surface. The second actuator drives the second head based on the first signal. The third actuator supports the first actuator and the second actuator and drives the first head and the second head. The first control line transmits the first signal to the first actuator. The second control line transmits the first signal to the second actuator. The filter executes a filtering process to remove one or more resonances from the first signal based on the sum of transfer functions, the one or more resonances being included in first transfer characteristics from the first signal transmitted via the first control line to response of the first head, the transfer functions being indicative of resonances included in second transfer characteristics from the first signal transmitted via the second control line to response of the first head, the filter being provided in the second control line.

Exemplary embodiments of a disc device and a control method will be explained below in detail with reference to the accompanying drawings. The present invention is not limited to the following embodiments.

First Embodiment

Figure 1:
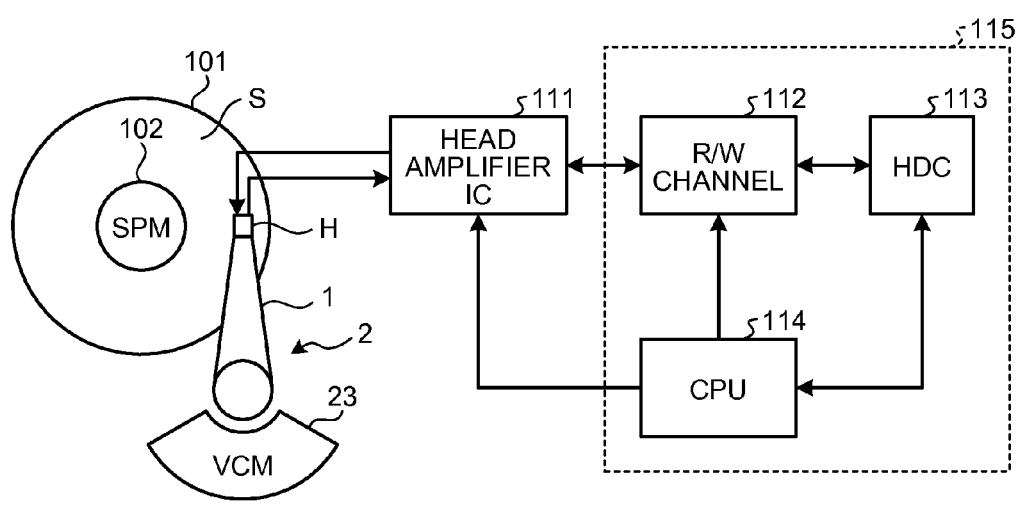
FIG. 1 is a block diagram of an example of a hardware configuration of a disc device according to a first embodiment.

FIG. 1 is a block diagram of an example of a hardware configuration of a disc device according to a first embodiment. As illustrated in FIG. 1, the disc device according to the embodiment includes a plurality of discs 101 that is fixed and rotated by a spindle motor 102 and has recording surfaces S in which data is recorded. The disc device also includes a plurality of heads H that is provided for each of the recording surfaces S of the discs 101 and is controlled in position relative to the recording surface S. In addition, the disc device includes a plurality of head suspensions 1 as examples of actuators for driving the heads H (examples of a first actuator and a second actuator) that is provided in correspondence with the plurality of heads H each. Further, the disc device includes a head stack assembly (HSA) 2 that supports the plurality of head suspensions 1 and drives the plurality of heads H. In the embodiment, each of the discs 101 has a first recording surface and a second recording surface opposite to one another.

Each of the heads H is assembled into the HSA 2 and capable of movement in the direction of the radius of the recording surface S of the disc 101. The HSA 2 is rotated and driven by a voice coil motor (VCM) 23 to drive the head H over the recording surface S of the disc 101. The head H has a write head for use in writing of data into the disc 101 and a read head for use in reading of data from the disc 101.

The disc device also has head amplifier integrated circuitry (hereinafter, referred to as head amplifier IC) 111, a read/write channel (hereinafter, referred to as R/W channel) 112, a head disc controller (HDC) 113, and a central processing unit (CPU) 114 as an example of a processor. In the embodiment, the R/W channel 112, the HDC 113, and the CPU 114 are incorporated into a one-chip integrated circuit 115.

The head amplifier IC 111 flows a write signal (current) according to write data input from the R/W channel 112 to the head H. The head amplifier IC 111 amplifies a read signal output from the head H (data read by the head H from the disc 101) and transmits the amplified signal to the R/W channel 112.

The R/W channel 112 is signal processing circuitry. In the embodiment, the R/W channel 112 encodes (code-modulates) write data input from the HDC 113 and outputs the encoded data to the head amplifier IC 111. The R/W channel 112 also decodes (code-demodulates) read data from a read signal transmitted by the head amplifier IC 111 and outputs the decoded data to the HDC 113.

The HDC 113 is a communication interface that allows communications with a host system not illustrated (for example, a personal computer or the like). Specifically, the HDC 113 exchanges write data and read data with the host system.

The CPU 114 is a main controller for the disc device, which performs various control processes such as control of reading or writing by the head H, servo control for controlling position of the head H over the recording surface S of the disc 101, and the like. The CPU 114 performs the various control processes by reading programs from a recording medium such as a ROM (read only memory) and executing the same.

Figure 2:
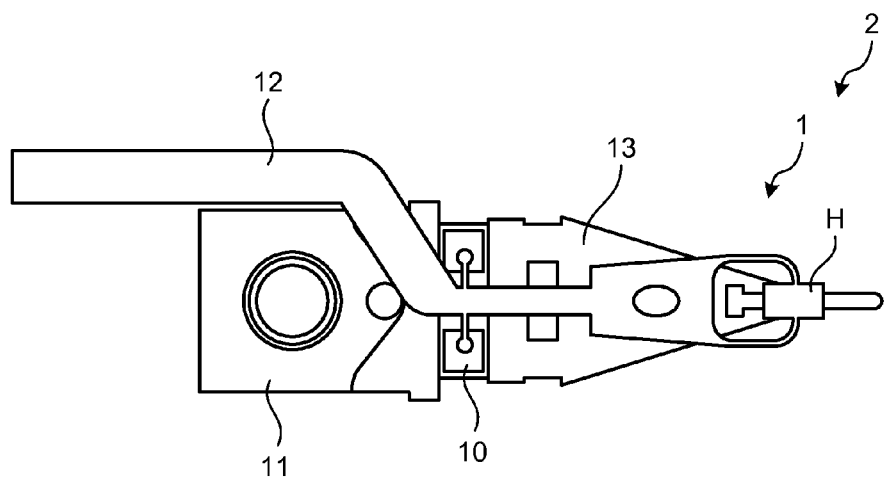
FIG. 2 is a diagram illustrating an example of a head suspension included in the disc device according to the first embodiment.

FIG. 2 is a diagram illustrating an example of a head suspension included in the disc device according to the first embodiment. The head suspension 1 in the disc device according to the embodiment is, as described above, provided in correspondence with each of the heads H, and drives the head H based on an input signal input from an output unit 30 (refer to FIG. 4). The input signal here is a signal (an example of a first signal) to position, out of the plurality of heads H, a head to be controlled as head H to be position-controlled over the recording surface S (an example of a first head) at a target position of the head to be controlled. Specifically, the input signal is a signal decided according to the target position of the head to be controlled and a position error. The position error refers to a difference between the target position of the head to be controlled and the control position of the head to be controlled.

As illustrated in FIG. 2, the head suspension 1 has a base plate 11, a flexure 12, a load beam 13, and one or more piezoelectric elements 10 as so-called micro actuators (MA) for driving only the head H. The piezoelectric element 10 is an actuator (an example of a first actuator) that is provided for each of the heads H and drives the head H based on an input signal input from the output unit 30 (refer to FIG. 4) to position the head to be controlled at the target position. The piezoelectric element 10 drives only the head H out of a dual stage actuator (DSA) for driving the head H at two stages.

The piezoelectric element 10 is provided between the base plate 11 (support plate) and the load beam 13 and is driven (extended and contracted) by an input signal (voltage V or current I) applied via the flexure 12 (wiring member). The piezoelectric element 10 displaces the load beam 13 in a track direction on the recording surface S of the disc 101 according to the input signal. Accordingly, the piezoelectric element 10 positions the head H attached to the load beam 13 at the target position on the recording surface S of the disc 101. The flexure 12 is connected to the output unit 30 via flexible printed circuits (FPC) 24.

Figure 3:
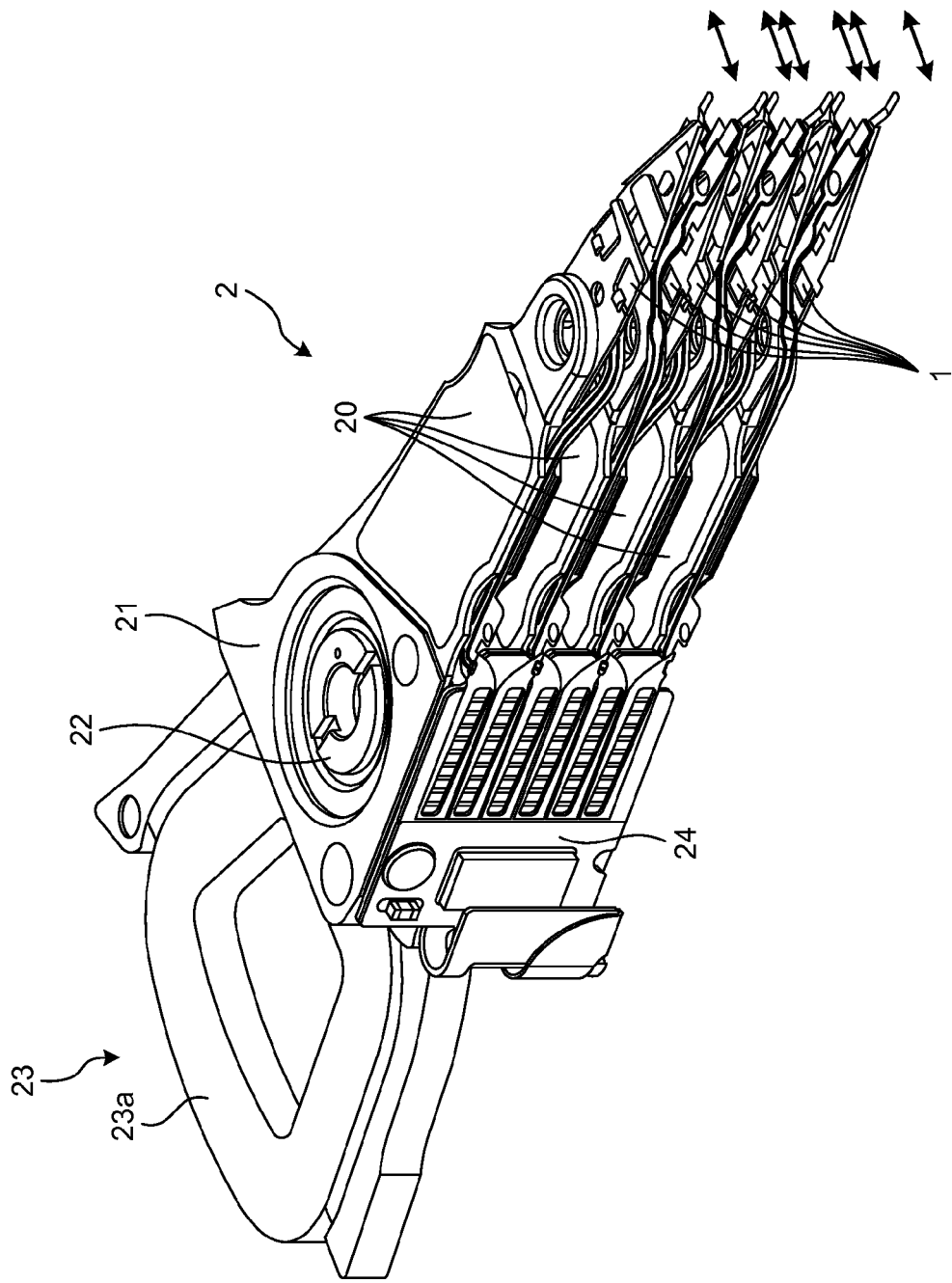
FIG. 3 is a diagram illustrating an example of a head stack assembly (HSA) included in the disc device according to the first embodiment.

FIG. 3 is a diagram illustrating an example of an HSA included in the disc device according to the first embodiment. As illustrated in FIG. 3, in the embodiment, the HSA 2 includes the plurality of head suspensions 1. The head suspensions 1 are attached to a carriage 21 via support arms 20 supporting the plurality of head suspensions 1. The HSA 2 includes the VCM 23 having a coil 23a, a magnet not illustrated, and a yoke not illustrated. The VCM 23 rotates the entire head suspensions 1 around a pivot bearing 22 via the carriage 21 and the support arms 20. The VCM 23 drives the entire head suspensions 1 out of a DSA for driving the head H at two stages. In the embodiment, the HSA 2 serves as an example of a third actuator that supports the plurality of suspensions 1 via the support arms 20 and drives the plurality of heads H.

The HSA 2 is so-called coarse motion actuator that drives the entire head suspension 1. The HSA 2 is used for the head H in wide-range seek operations on the recording surface S. The head suspension 1 is a so-called fine motion actuator that drives only the head H. The head suspension 1 is used for positioning of the head to be controlled at the target position on the recording surface S of the disc 101 based on the input signal.

Figure 4:
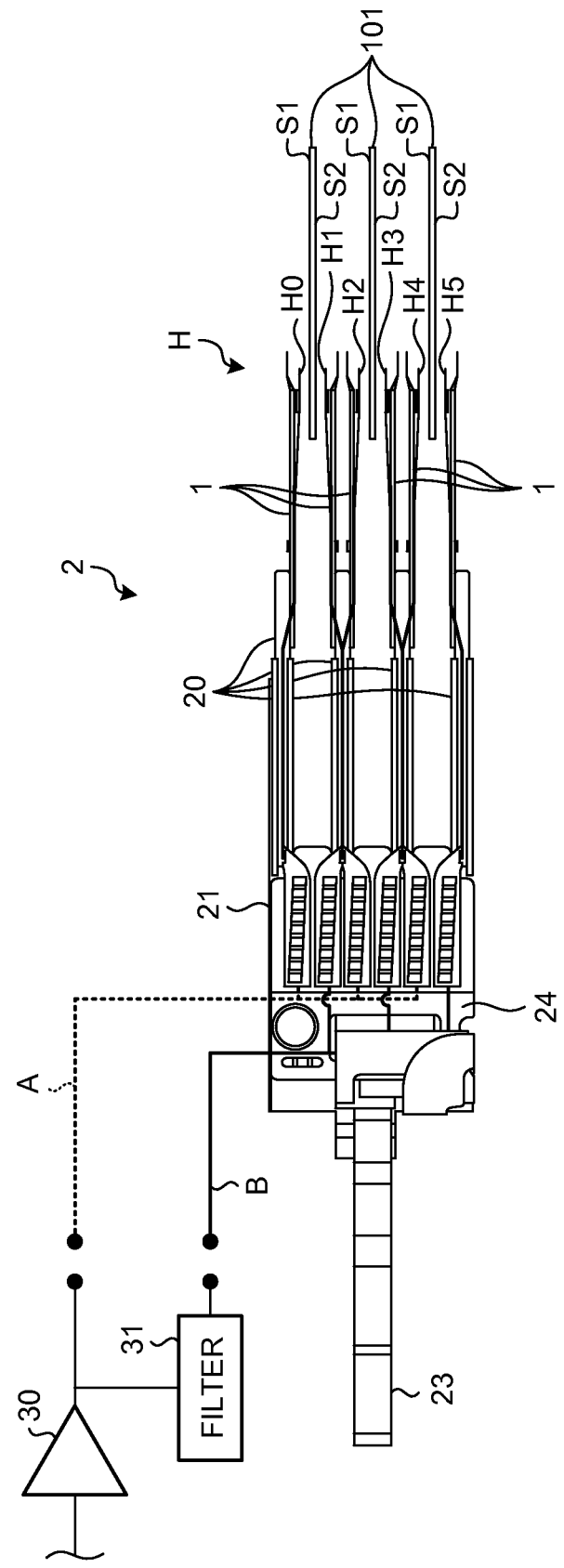
FIG. 4 is a schematic diagram of an example of a control system included in the disc device according to the first embodiment.
Figure 5:
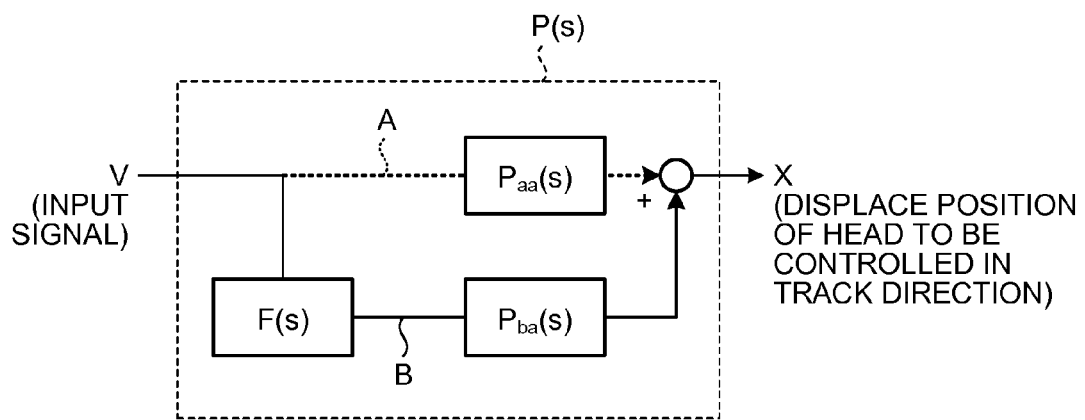
FIG. 5 is an illustrative diagram for explaining transfer characteristics from input signal to response of a head to be controlled in the disc device according to the first embodiment.

FIG. 4 is a schematic diagram of an example of a control system included in the disc device according to the first embodiment. FIG. 5 is an illustrative diagram for explaining transfer characteristics from input signal to response of a head to be controlled in the disc device according to the first embodiment. As illustrated in FIG. 4, in the embodiment, the plurality of heads H includes UP heads H0, H2, and H4 set on one recording surface (hereinafter, referred to as first recording surface S1) side of the discs 101 and DN heads H1, H3, and H5 set on the other recording surface (hereinafter, referred to as second recording surface S2) side opposite to the first recording surface S1 side of the disc 101.

In addition, in the embodiment, the disc device has a control line A (an example of a first control line) that is connected to the piezoelectric elements 10 of the UP heads H0, H2, and H4 as examples of the first head position-controlled over the first recording surfaces S1 and transmits an input signal to the piezoelectric elements 10. The disc device also has a control line B (an example of a second control line) that is connected to the piezoelectric elements 10 of the DN heads H1, H3, and H5 as examples of the second head position-controlled over the second recording surfaces S2 and transmits an input signal to the piezoelectric elements 10. That is, in the embodiment, the input signals are individually transmitted to each of the piezoelectric elements 10 of the UP heads H0, H2, and H4 and each of the piezoelectric elements 10 of the DN heads H1, H3, and H5 (examples of three or more actuators) via the different control signal lines (examples of control lines).

In addition, the disc device according to the embodiment has the output unit 30 that outputs input signals decided by the CPU 114 (control unit) to both the control line A and the control line B. The disc device also has a filter 31 that is provided in either the control line A or the control line B to transmit input signals to the piezoelectric elements 10 of the heads H other than the head to be controlled (hereinafter, referred to as heads not to be controlled). In the following description, the UP head H0 is a head to be controlled and the filter 31 is provided in the control line B. However, when the DN head H1, H3, or H5 is a head to be controlled, the filter 31 is provided in the control line A.

The filter 31 subjects the input signal transmitted via the control line B to a filtering process of removing one or more resonances (hereinafter, referred to as resonance peak) from transfer characteristics (an example of first transfer characteristics) from an input signal transmitted via the control line A to response of the head to be controlled by transfer characteristics (an example of second transfer characteristics) from an input signal transmitted via the control line B to response of the head to be controlled. Accordingly, the control line B transmits, to the head suspensions 1 of the DN heads H1, H3, and H5, a signal that is the input signal output from the output unit 30 and is multiplied by the characteristics of the filter 31 (filter characteristics).

Accordingly, as illustrated in FIG. 5, transfer characteristics P(s) from an input signal to response to the head to be controlled are expressed by the sum of transfer characteristics (frequency response characteristics) $P_{aa}(s)$ from an input signal transferred via the control line A to response of the head to be controlled and transfer characteristics (frequency response characteristics) $P_{ba}(s)$ from an input signal transmitted via the control line to response of the head to be controlled, multiplied by the filter characteristic F(s) of the filter 31.

In this case, when the characteristics of removing the resonance peaks from the transfer characteristics $P_{aa}(s)$ are designated as $P'_{aa}(s)$, $P'_{aa}(s)$ are expressed by the following equation (1):

$$P'_{aa}(s)=1-P_{aa}(s) \quad (1)$$

In addition, when the filter characteristics F(s) of the filter 31 are expressed by the following equation (2), the transfer characteristics P(s) are expressed by the following equation (3):

$$F(s)=P'_{aa}(s)/P_{ba}(s)=\{1-P_{aa}(S)\}/P_{ba}(S) \quad (2)$$

$$P(s)=P_{aa}(s)+F(s) \cdot P_{ba}(s)=P_{aa}(s)+[\{1-P_{aa}(s)\}/P_{ba}(s)] \cdot P_{ba}(s)=P_{aa}(s)+1-P_{aa}(s)=1 \quad (3)$$

Figure 6A:
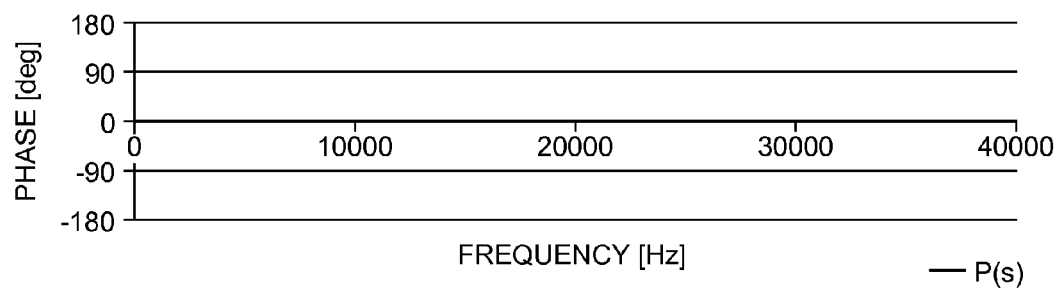
FIG. 6A is a diagram illustrating an example of a phase characteristic of transfer characteristics P(s) in the disc device according to the first embodiment.
Figure 6B:
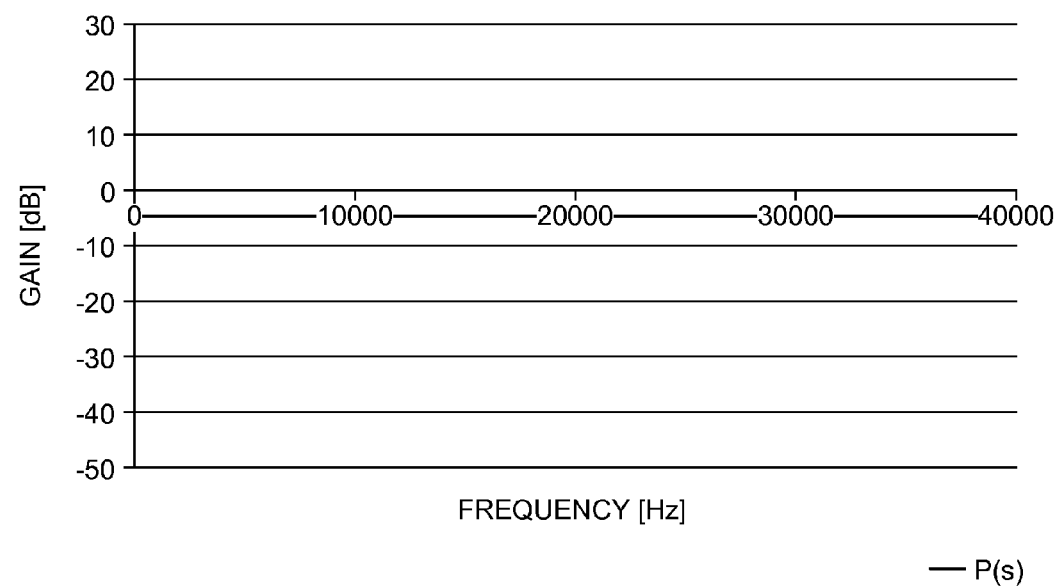
FIG. 6B is a diagram illustrating an example of a gain characteristic of the transfer characteristics P(s) in the disc device according to the first embodiment.

FIG. 6A is a diagram illustrating an example of a phase characteristic of the transfer characteristics P(s) in the disc device according to the first embodiment. In FIG. 6A, the vertical axis represents phase and the horizontal axis represents frequency. FIG. 6B is a diagram illustrating an example of a gain characteristic of the transfer characteristics P(s) in the disc device according to the first embodiment. In FIG. 6B, the vertical axis represents gain and the horizontal axis represents frequency.

The transfer characteristics P(s) is determined as "1" by subtracting $P'_{aa}(s)$ from the transfer characteristics $P_{aa}(s)$ as expressed in the equation (3). Accordingly, as described in FIGS. 6A and 6B, the phase characteristic and the gain characteristic of the transfer characteristics P(s) ideally become uniform, and the transfer characteristics from the input signal to response of the head to be controlled are improved to increase the servo bandwidth in which the head to be controlled can be positioned.

Next, a method for determining the filter characteristics F(s) of the filter 31 included in the disc device according to the embodiment will be described in detail.

As expressed by the following equations (4) and (6), the transfer characteristics $P_{aa}(s)$ are represented by the sum of second lag system transfer functions $G_{an}(s)$ as examples of the transfer functions for the each resonance peaks. In addition, as expressed by the following equations (5) and (7), the transfer characteristics $P_{ba}(s)$ are represented by the sum of second lag system transfer functions $G_{bn}(s)$ as examples of transfer functions for the each resonance peaks:

$$P_{aa}(s)=G_{a1}(s)+G_{a2}(s)+\ldots G_{an}(s) \quad (4)$$

$$P_{ba}(s)=G_{b1}(s)+G_{b2}(s)+\ldots G_{bn}(s) \quad (5)$$

$$G_{an}(s)=(1/K_{an}) \cdot (\omega_{an}^2/s^2+2\zeta_{an}\omega_{an}s+\omega_{an}^2) \quad (6)$$

$$G_{bn}(s)=(1/K_{bn}) \cdot (\omega_{an}^2/s^2+2\zeta_{bn}\omega_{bn}s+\omega_{bn}^2) \quad (7)$$

where $\omega_{an}$ denotes the resonance frequency of the transfer characteristics $P_{aa}(s)$, $\omega_{bn}$ denotes the resonance frequency of the transfer characteristics $P_{ba}(s)$, $\zeta_{an}$ denotes the damping rate of the transfer characteristics $P_{aa}$, $\zeta_{bn}$ denotes the damping rate of the transfer characteristics $P_{ba}$, $K_{an}$ denotes the amplitude of the transfer characteristics $P_{aa}$ with a frequency of 0, $K_{bn}$ denotes the amplitude of the transfer characteristics $P_{ba}$ with a frequency of 0, and n denotes an integer of 1 or larger.

Figure 7A:
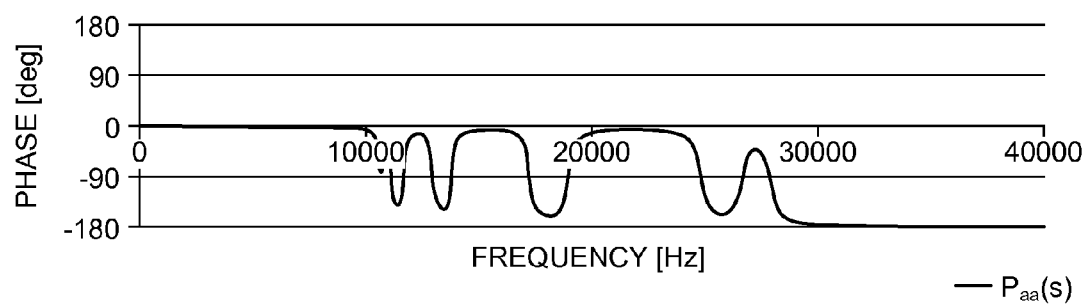
FIG. 7A is a diagram illustrating an example of a phase characteristic of transfer characteristics $P_{aa}(s)$ in the disc device according to the first embodiment.
Figure 7B:
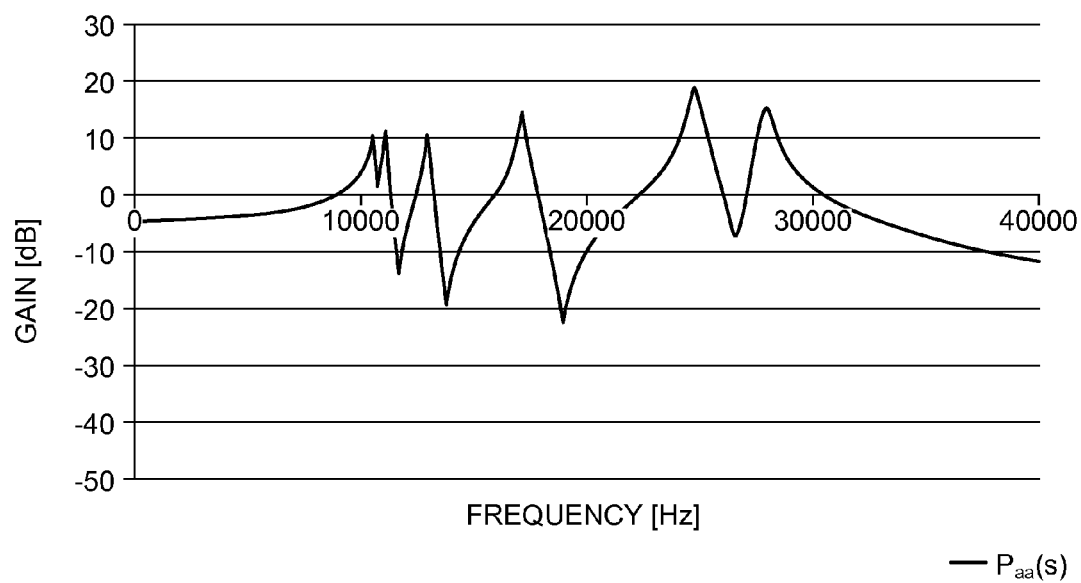
FIG. 7B is a diagram illustrating an example of a gain characteristic of the transfer characteristics $P_{aa}(s)$ in the disc device according to the first embodiment.
Figure 8A:
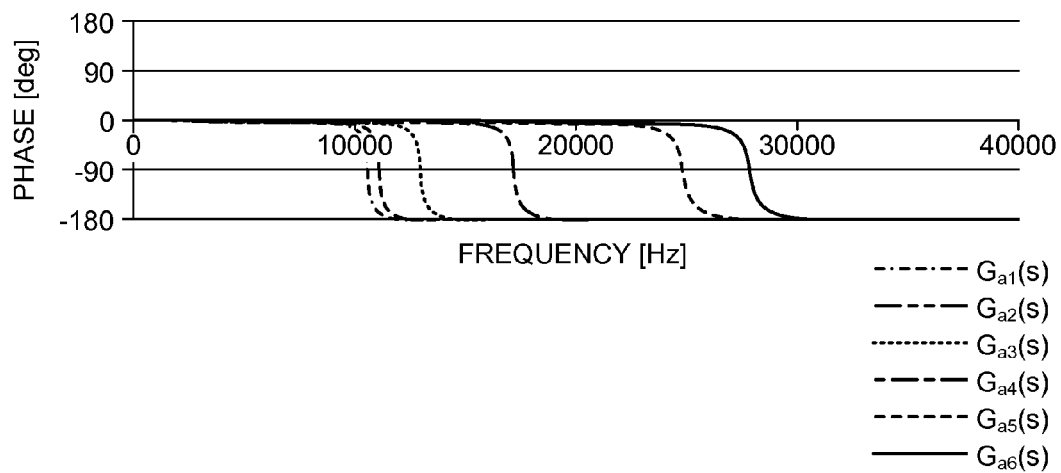
FIG. 8A is a diagram illustrating an example of a phase characteristic of second lag system transfer functions $G_{an}(s)$ in the disc device according to the first embodiment.
Figure 8B:
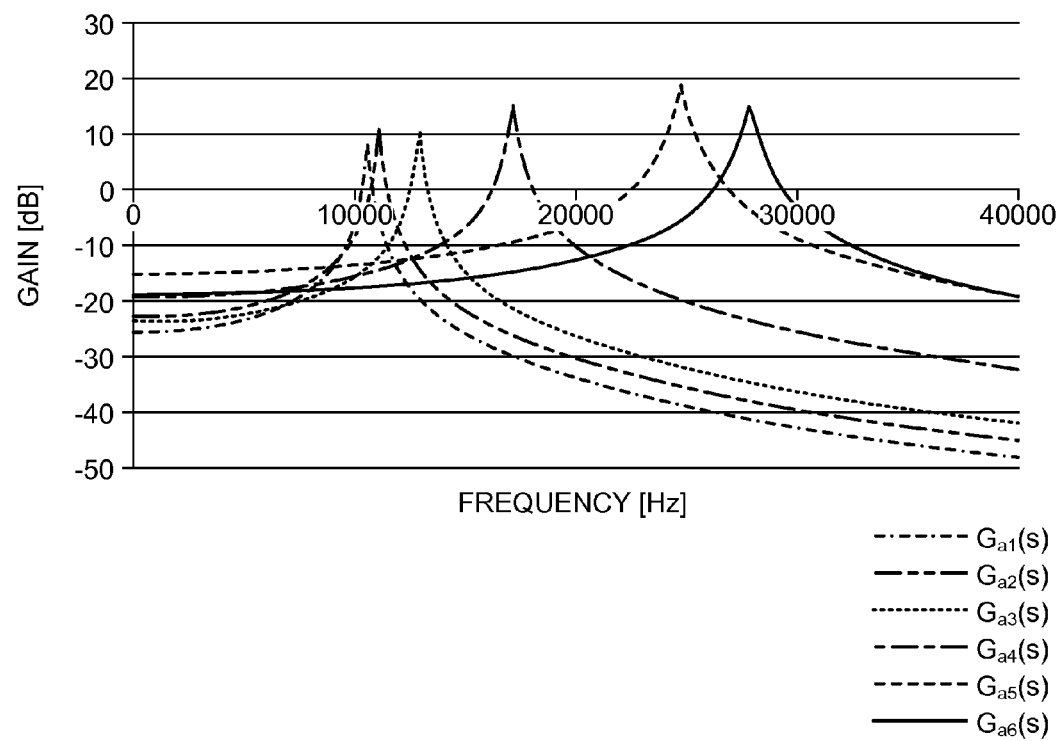
FIG. 8B is a diagram illustrating an example of a gain characteristic of the second lag system transfer functions $G_{an}(s)$ in the disc device according to the first embodiment.
Figure 9A:
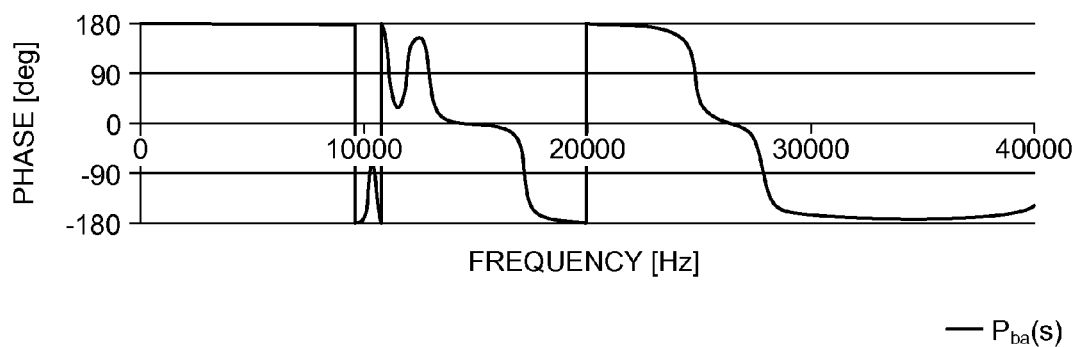
FIG. 9A is a diagram illustrating an example of a phase characteristic of transfer characteristics $P_{ba}(s)$ in the disc device according to the first embodiment.
Figure 9B:
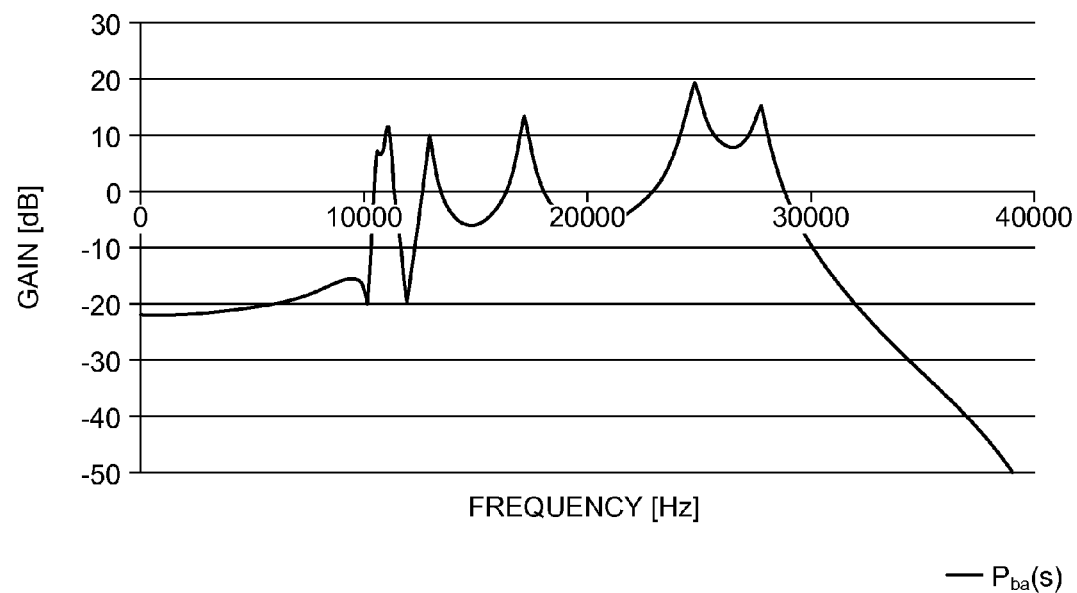
FIG. 9B is a diagram illustrating an example of a gain characteristic of the transfer characteristics $P_{ba}(s)$ in the disc device according to the first embodiment.
Figure 10A:
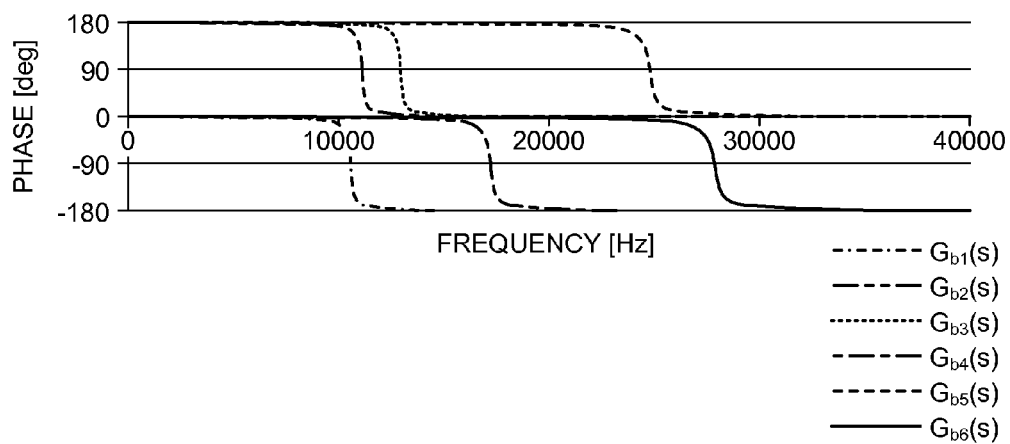
FIG. 10A is a diagram illustrating an example of a phase characteristic of second lag system transfer functions $G_{bn}(s)$ in the disc device according to the first embodiment.
Figure 10B:
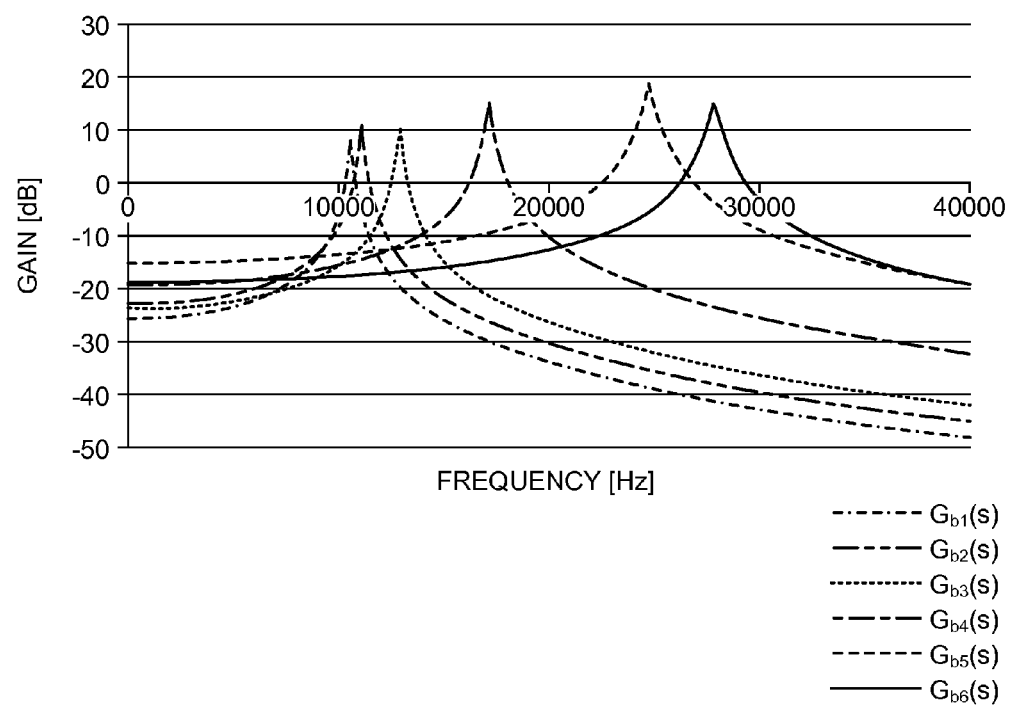
FIG. 10B is a diagram illustrating an example of a gain characteristic of the second lag system transfer functions $G_{bn}(s)$ in the disc device according to the first embodiment.

FIG. 7A is a diagram illustrating an example of a phase characteristic of the transfer characteristics $P_{aa}(s)$ in the disc device according to the first embodiment. FIG. 7B is a diagram illustrating an example of a gain characteristic of the transfer characteristics $P_{aa}(s)$ in the disc device according to the first embodiment. FIG. 8A is a diagram illustrating an example of a phase characteristic of the second lag system transfer functions $G_{an}(s)$ in the disc device according to the first embodiment. FIG. 8B is a diagram illustrating an example of a gain characteristic of the second lag system transfer functions $G_{an}(s)$ in the disc device according to the first embodiment. FIG. 9A is a diagram illustrating an example of a phase characteristic of the transfer characteristics $P_{ba}(s)$ in the disc device according to the first embodiment. FIG. 9B is a diagram illustrating an example of a gain characteristic of the transfer characteristics $P_{ba}(s)$ in the disc device according to the first embodiment. FIG. 10A is a diagram illustrating an example of a phase characteristic of the second lag system transfer functions $G_{bn}(s)$ in the disc device according to the first embodiment. FIG. 10B is a diagram illustrating an example of a gain characteristic of the second lag system transfer functions $G_{bn}(s)$ in the disc device according to the first embodiment. In each of FIGS. 7A, 8A, 9A, and 10A, the vertical axis represents phase and the horizontal axis represents frequency. In each of FIGS. 7B, 8B, 9B, and 10B, the vertical axis represents gain and the horizontal axis represents frequency.

As illustrated in FIGS. 7A, 7B, 8A, 8B, 9A, 9B, 10A, and 10B, the second lag system transfer functions $G_{an}(s)$ and the second lag system transfer functions $G_{bn}(s)$ are similar in oscillatory system, which allows approximations as expressed by the following equations (8) and (9):

$$\omega_{an}=\omega_{bn}(=\omega_n) \qquad (8)$$

$$\zeta_{an}=\zeta_{bn}(=\zeta_n) \qquad (9)$$

In addition, for the resonance peaks to be removed from the resonance peaks included in the transfer characteristics $P_{aa}(s)$, the relationships among the second lag system transfer functions $G_{an}(s)$, the second lag system transfer functions $G_{bn}(s)$, and the filter characteristics $F_n(s)$ are expressed by the following equation (10):

$$G_{an}(s)+G_{bn}(s)\cdot F_n(s)=1/K_{an} \qquad (10)$$

Then, the equations (6) to (9) are substituted into the equation (10) to obtain the filter characteristics $F_n(s)$ expressed by the following equation (11):

$$F_n(s)=K_{bn}/(K_{an}\omega_n^2)\cdot(s^2+2\zeta_n\omega_n s \qquad (11)$$

Figure 11A:
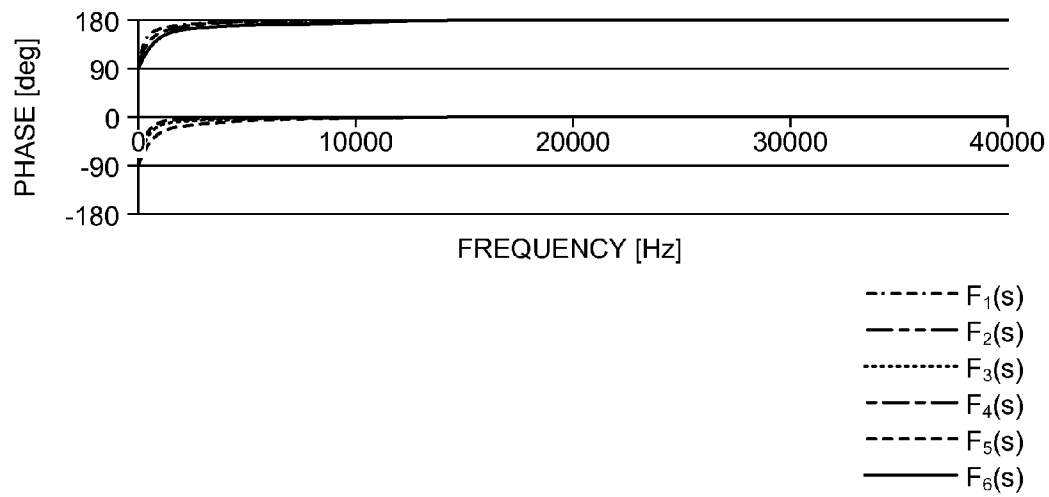
FIG. 11A is a diagram illustrating an example of a phase characteristic of filter characteristics $F_n(s)$ of the disc device according to the first embodiment.
Figure 11B:
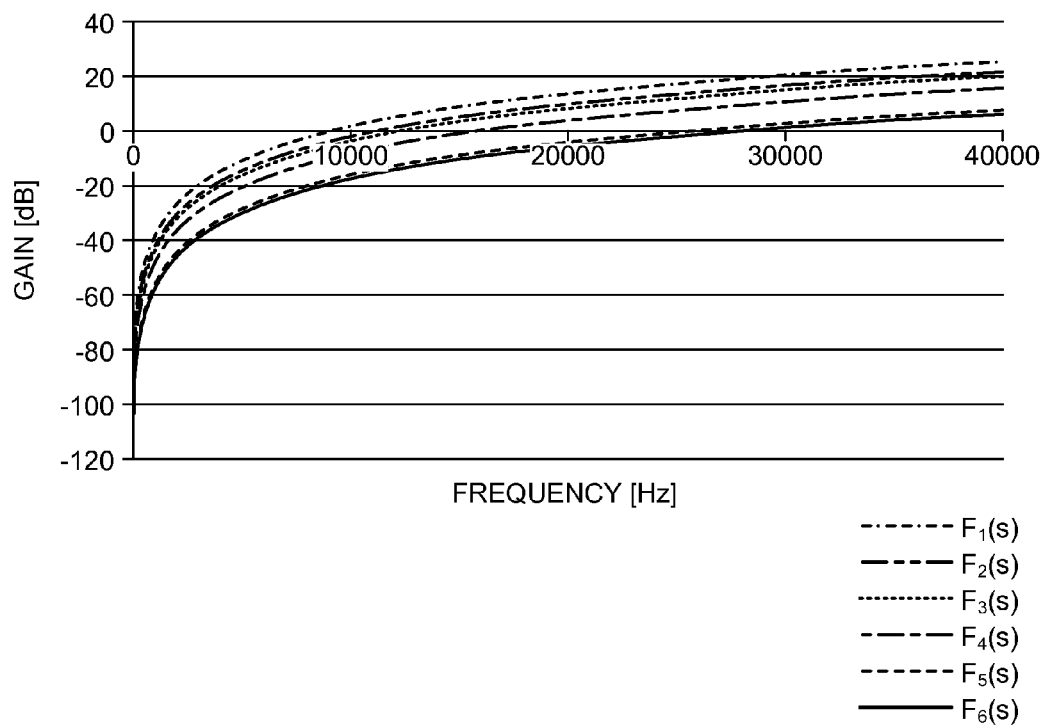
FIG. 11B is a diagram illustrating an example of a gain characteristic of the filter characteristics $F_n(s)$ of the disc device according to the first embodiment.

FIG. 11A is a diagram illustrating an example of a phase characteristic of the filter characteristics $F_n(s)$ of the disc device according to the first embodiment. FIG. 11B is a diagram illustrating an example of a gain characteristic of the filter characteristics $F_n(s)$ of the disc device according to the first embodiment. As illustrated in FIGS. 8A, 8B, 10A, 10B, 11A, and 11B, the filter characteristics $F_n(s)$ expressed by the equation (11) have the characteristics of cancelling out shifts in the second lag system transfer functions $G_{bn}(s)$ based on the second lag system transfer functions $G_{an}(s)$.

As illustrated in FIGS. 8A and 10A, for example, the phase characteristic of the second lag system transfer function $G_{b5}(s)$ with the resonance frequency of $\omega_5$ is shifted about 180° from the phase characteristic of the second lag system transfer function $G_{a5}(s)$ with the resonance frequency $\omega_5$. Therefore, as illustrated in FIG. 11A, the filter characteristic $F_5(s)$ with the resonance frequency $\omega_5$ has the characteristic of cancelling out a shift in the phase characteristic of the second lag system transfer function $G_{b5}(s)$ based on the phase characteristic of the second lag system transfer function $G_{a5}(s)$.

Accordingly, the transfer characteristics $P_{ba}(s)$ from the input signal transmitted via the control line B to response of the head to be controlled are expressed by the following equation (12):

$$F_1(s)\cdot G_{b1}(s)+F_2(s)\cdot G_{b2}(s)+\ldots+F_n(s)\cdot G_{bn}(s)=F(s)\cdot P_{ba}(s) \qquad (12)$$

Further, when the equation (5) is substituted into the transfer characteristics $P_{ba}(s)$ expressed by the equation (12), the filter characteristics $F(s)$ are expressed by the following equation (13). That is, as expressed by the following equation (13), the filter 31 has the filter characteristics $F_n$ of removing the resonance peaks from the transfer characteristics $P_{aa}(s)$ by the sum of the second lag system transfer functions $G_{bn}(s)$ at the each resonance peaks $\omega_n$.

$$F(s)=\{F_1(s)\cdot G_{b1}(s)+F_2(s)\cdot G_{b2}(s)+\ldots+F_n(s)\cdot G_{ba}(s)\}/\{G_{b1}(s)+G_{b2}(s)+\ldots+G_{b2}(s)\} \qquad (13)$$

Figure 12A:
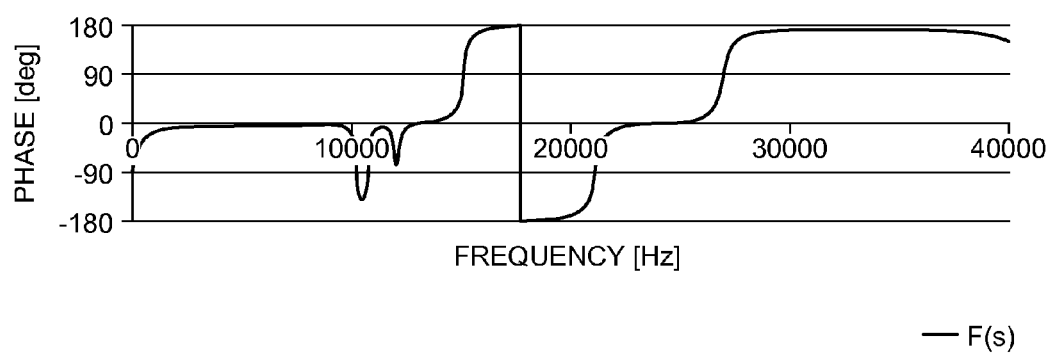
FIG. 12A is a diagram illustrating an example of a phase characteristic of filter characteristics of a filter of the disc device according to the first embodiment.
Figure 12B:
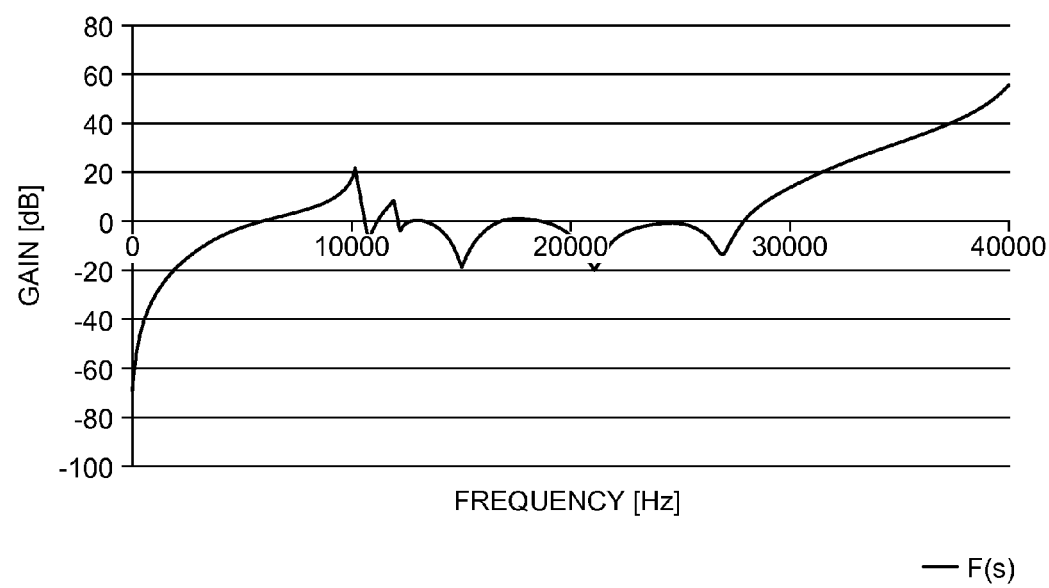
FIG. 12B is a diagram illustrating an example of a gain characteristic of the filter characteristics of the filter of the disc device according to the first embodiment.

FIG. 12A is a diagram illustrating an example of a phase characteristic of the filter characteristics of the disc device according to the first embodiment. In FIG. 12A, the vertical axis represents phase and the horizontal axis represents frequency. FIG. 12B is a diagram illustrating an example of a gain characteristic of the filter characteristics of the filter of the disc device according to the first embodiment. In FIG. 12B, the vertical axis represents gain and the horizontal axis represents frequency. As illustrated in FIGS. 12A and 12B, the filter characteristics $F(s)$ illustrated in the equation (13) are the characteristics of cancelling out shifts in the transfer characteristics $P_{ba}(s)$ based on the transfer characteristics $P_{aa}(s)$.

Accordingly, the transfer characteristics from the input signal transmitted via the control line B to response of the head to be controlled can have the characteristics of removing the resonance peaks from the transfer characteristics from input of the signal transmitted via the control line A to response of the head to be controlled. Accordingly, it is possible to improve the transfer characteristics from the input signal to response of the head to be controlled and increase the servo bandwidth in which the head H can be positioned.

In the foregoing description, when the head to be controlled is the UP head H0, the process of removing the resonance peaks from the transfer characteristics from the input signal to response of the UP head H0. Alternatively, even when the head to be controlled is the head H other than the UP head H0, the resonance peaks can be removed from the transfer characteristics from the input signal to response of the head to be controlled in the same manner.

According to the first embodiment, the input signal transmitted via the control line B is subjected to the filtering process of removing one or more resonance peaks from the transfer characteristics from the input signal transmitted via the control line A for the head to be controlled to response of the head to be controlled, by the sum of transfer functions indicating the resonance peaks included in the transfer characteristics from the input signal transmitted via the control line B for the head to be controlled to response of the head to be controlled. As a result, it is possible to improve the transfer characteristics from the input signal to response of the head to be controlled, and produce the advantage of increasing the servo bandwidth in which the head H can be positioned.

Second Embodiment

A second embodiment is an example of a filtering process of removing some of the resonance peaks from the transfer characteristics from the input signal via the control line for the head to be controlled to response of the head to be controlled. Hereinafter, no description will be given as to the same parts as those of the first embodiment.

In the first embodiment, the filter 31 performs the filtering process of removing all of the resonance peaks from the transfer characteristics $P_{aa}(s)$ from the input signal transmitted via the control line A to response of the head to be controlled. However, the present invention is not limited to this. For example, the filter 31 may perform a filtering process of removing some of the resonance peaks from the transfer characteristics $P_{aa}(s)$ from the input signal transmitted via the control line A to response of the head to be controlled, according to the constraints of the time allowed for the filtering process at position control of the head to be controlled.

Specifically, when the filter 31 performs the filtering process of removing the resonance peaks with the resonance frequencies $\omega_1$ and $\omega_2$ from the transfer characteristics $P_{aa}(s)$, out of the filter characteristics $F_n(s)$ with the resonance frequencies co, expressed by the foregoing equation (13), the filter characteristics $F_n(s)$ other than the filter characteristics $F_1(s)$ and $F_2(s)$ with the resonance frequencies $\omega_1$ and $\omega_2$ are set to "1" as expressed by the following equation (14):

$$F(s)=\{F_1(s)\cdot G_{b1}(s)+F_2(s)\cdot G_{b2}(s)+G_{b3}(s)+\ldots+G_{bn}(s)\}/\{G_{b1}(s)+G_{b2}(s)+\ldots+G_{bn}(s)\} \quad (14)$$

Figure 13A:
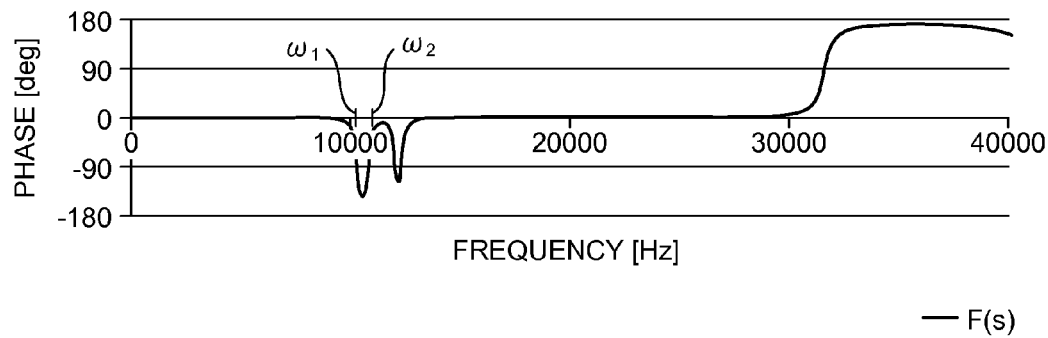
FIG. 13A is a diagram illustrating an example of a phase characteristic of filter characteristics Fn(s) of a filter of a disc device according to a second embodiment.
Figure 13B:
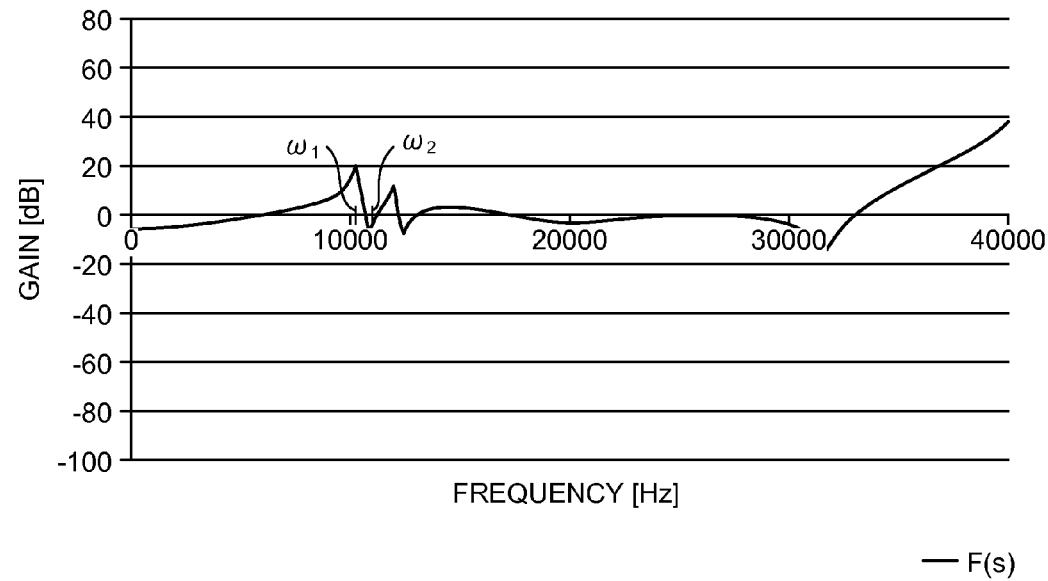
FIG. 13B is a diagram illustrating an example of a gain characteristic of the filter characteristics Fn(s) of the filter of the disc device according to the second embodiment.
Figure 14A:
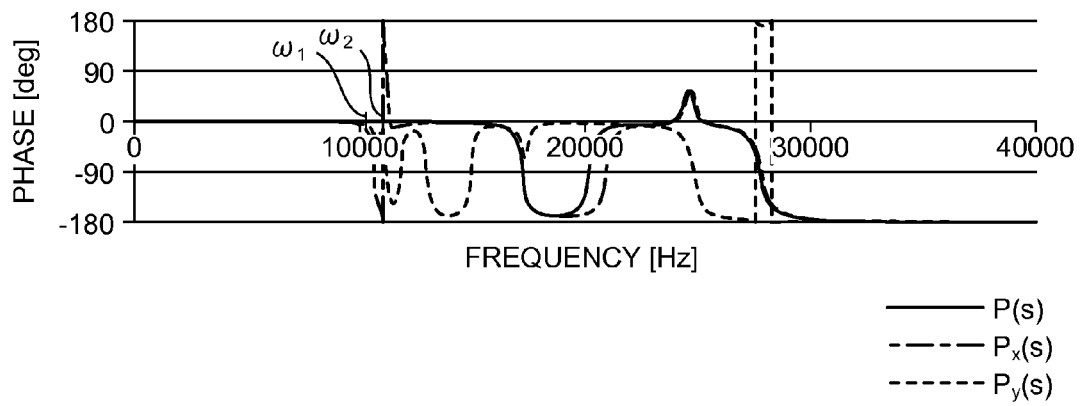
FIG. 14A is a diagram illustrating an example of a phase characteristic of transfer characteristics P(s) in the disc device according to the second embodiment.
Figure 14B:
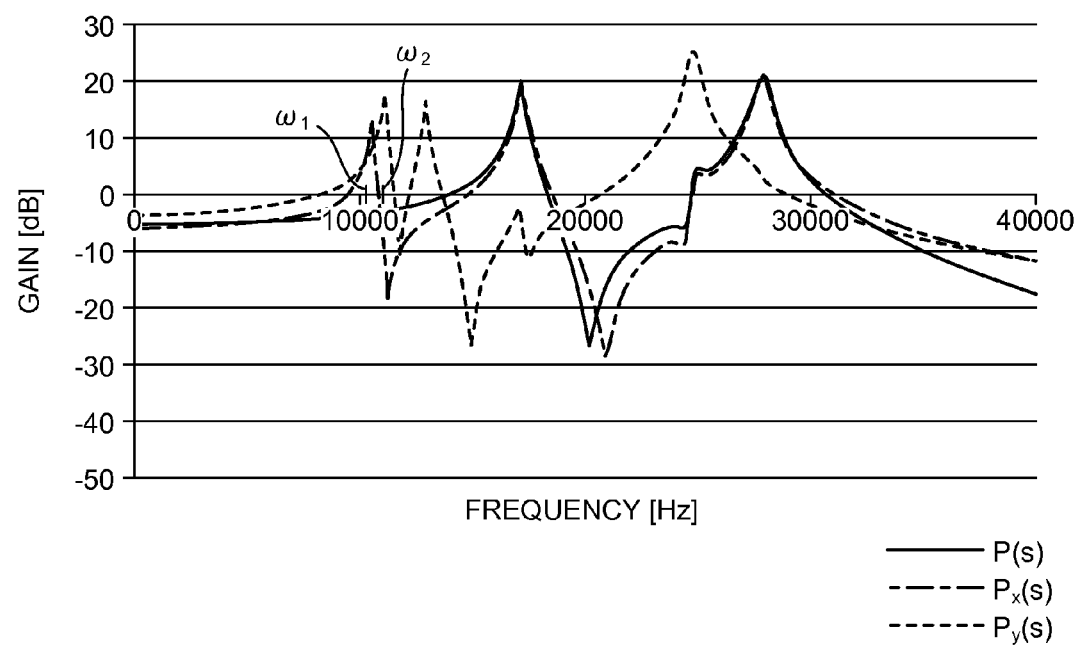
FIG. 14B is a diagram illustrating an example of a gain characteristic of the transfer characteristics P(s) in the disc device according to the second embodiment.

FIG. 13A is a diagram illustrating an example of a phase characteristic of the filter characteristics Fn(s) of a disc device according to the second embodiment. FIG. 13B is a diagram illustrating an example of a gain characteristic of the filter characteristics Fn(s) of the disc device according to the second embodiment. FIG. 14A is a diagram illustrating an example of a phase characteristic of the transfer characteristics P(s) in the disc device according to the second embodiment. FIG. 14B is a diagram illustrating an example of a gain characteristic of the transfer characteristics P(s) in the disc device according to the second embodiment. In each of FIGS. 13A and 14A, the vertical axis denotes phase and the horizontal axis represents frequency. In each of FIGS. 13B and 14B, the vertical axis represents gain and the horizontal axis represents frequency.

As illustrated in FIGS. 13A and 13B, in the embodiment, the filter characteristics F(s) have the characteristic of removing the resonance peaks from the transfer functions $P_{aa}(s)$ only with the resonance frequencies $\omega_1$ and $\omega_2$. Since there is no need to perform the filtering process of removing the resonance peaks from the transfer characteristics $P_{aa}(s)$ with all of the resonance frequencies $\omega_n$, it is possible to shorten the time taken for performing the filtering process at position control of the head to be controlled.

In addition, as illustrated in FIGS. 14A and 14B, when the head to be controlled (for example, the UP head H0) and the head not to be controlled (for example, the DN head H1) are driven in phase, the resonance peak with the resonance frequency $\omega_2$ is removed from the phase characteristics and the gain characteristics of transfer characteristics $P_x(s)$ from the input signal to response of the head to be controlled, but the resonance peak with the resonance frequency $\omega_1$ is not removed from the same. In addition, when the head to be controlled and the head not to be controlled are driven in reversed phase, the resonance peak with the resonance frequency $\omega_1$ is removed from the phase characteristic and the gain characteristic of transfer characteristics $P_y(s)$ from the input signal to response of the head to be controlled, but the resonance peak with the resonance frequency $\omega_2$ is not removed from the same. In contrast, according to the transfer characteristics P(s) in the disc device according to the embodiment, the resonance peaks with the both resonance frequencies $\omega_1$ and $\omega_2$ are removed.

According to the second embodiment, the filtering process of removing some of the resonance peaks from the transfer characteristics from the input signal transmitted via the control line A to response of the head to be controlled is performed. As a result, it is possible to produce the advantage of shortening the time taken for the filtering process.

Third Embodiment

A third embodiment is an example in which control lines are provided to transmit input signals individually to the plurality of disc suspensions 1. Hereinafter, no description will be given as to the same parts as those of the first embodiment.

Figure 15:
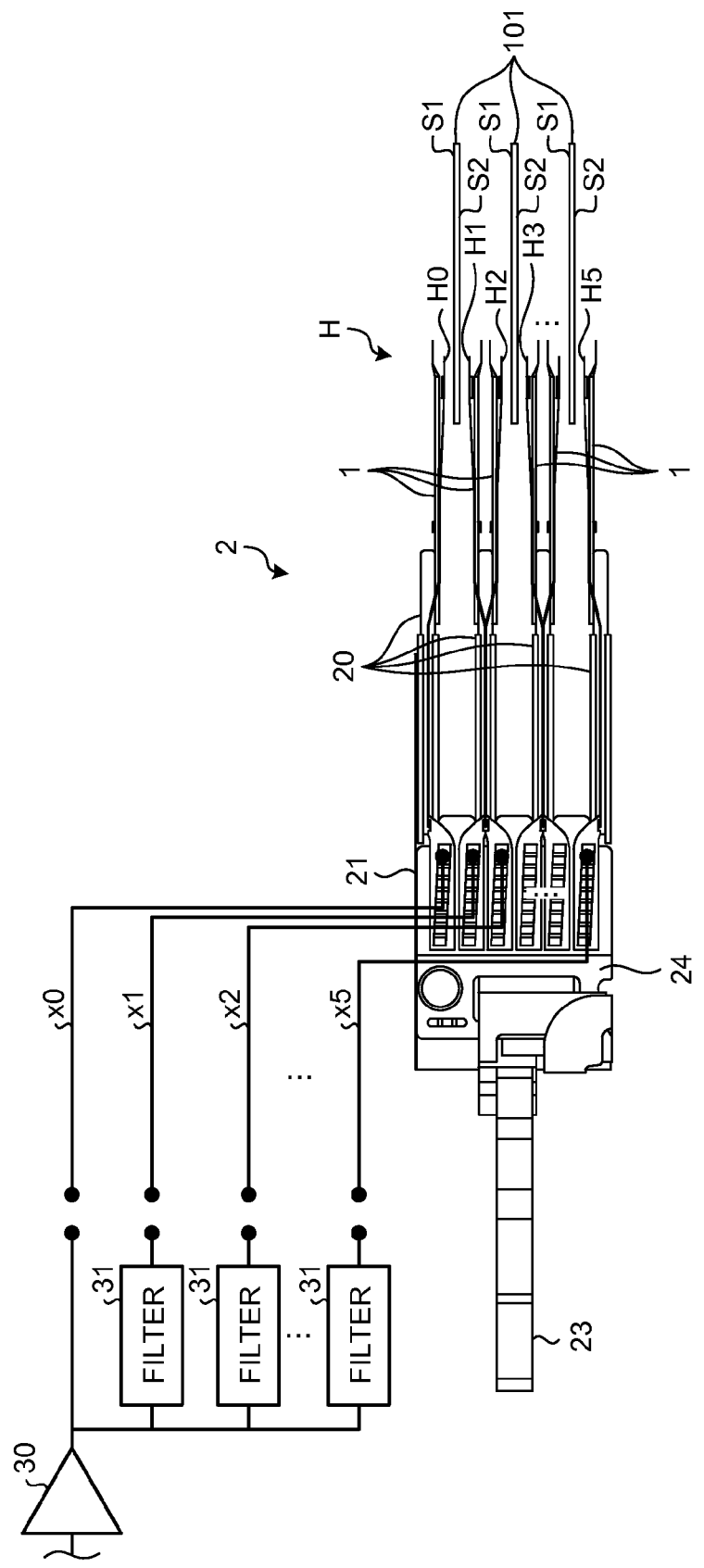
FIG. 15 is a schematic diagram of an example of a control system included in a disc device according to a third embodiment.
Figure 16:
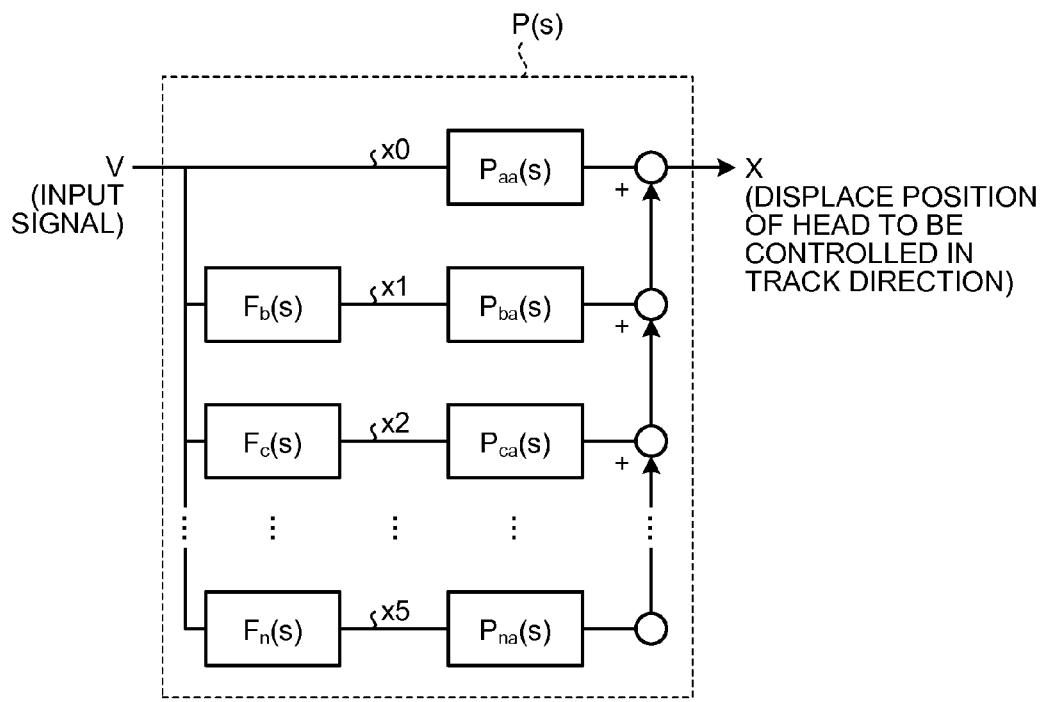
FIG. 16 is an illustrative diagram for explaining transfer characteristics from input signal to response of a head to be controlled in the disc device according to the third embodiment.

FIG. 15 is a schematic diagram of an example of control systems included in a disc device according to the third embodiment. FIG. 16 is an illustrative diagram for explaining transfer characteristics from input signal to response of a head to be controlled in the disc device according to the third embodiment. As illustrated in FIG. 15, the disc device according to the embodiment has control lines x0, x1, . . . , x5 to transmit input signals individually to each of the piezoelectric elements 10 of the plurality of disc suspensions 1.

Then, of the control lines x0, x1, . . . , x5, the control line x0 for the piezoelectric element 10 of the head to be controlled (for example, the UP head H0) is not provided with the filter 31. Meanwhile, of the control lines x0, x1, . . . , x5, the control lines x1, . . . , x5 for the piezoelectric elements 10 of the heads not to be controlled (for example, the UP heads H2, H4, DN heads H1, H3, and H5) are individually provided with the filters 31.

In the embodiment, the disc device has the filters 31 provided individually for the control lines x1, . . . , x5 for the piezoelectric elements 10 of the heads not to be controlled.

Thus, in the embodiment, the transfer characteristics P(s) are expressed by the following equation (15):

$$P(s)=P_{aa}(S)+F_b(s)\cdot P_{ba}(s)+F_c(s)\cdot P_{ca}(s)+\ldots+F_n(s)\cdot P_{na}(s) \quad (15)$$

where $P_{aa}(s)$, $P_{ba}(s)$, $P_{ca}(s)$, . . . , $P_{na}(s)$ denote transfer characteristics from the input signals transmitted via the control lines x0, x1, . . . , x5 to response of the head to be controlled, and $F_b(s)$, $F_c(s)$, . . . , $F_n(s)$ denote filter characteristics of the filters 31 in the control lines x1, . . . , x5.

Each of the filter characteristics $F_b(s)$, $F_c(s)$, . . . , $F_n(s)$ of the filters 31 of the control lines x1, . . . , x5 are decided to satisfy the following equation (16):

$$F_b(s)\cdot P_{ba}(s)+F_c(s)\cdot P_{ca}(s)+\ldots+F_n(s)\cdot P_{na}(s)=P_{aa}'(s)=1-P_{aa}(s) \quad (16)$$

According to the third embodiment, it is possible to produce the same advantages as those in the first embodiment.

In the first to third embodiments, as examples of the first actuator and the second actuator for driving the heads H, the load beam-driving actuators are used to drive only the load beams 13 included in the head suspensions 1 to drive the heads H. However, the present invention is not limited to this. For example, instead of the load beam-driving actuators, gimbal-driving actuators with piezoelectric elements provided in the vicinity of the heads H may be used as the first actuator and the second actuator for driving the heads H.

Figure 17:
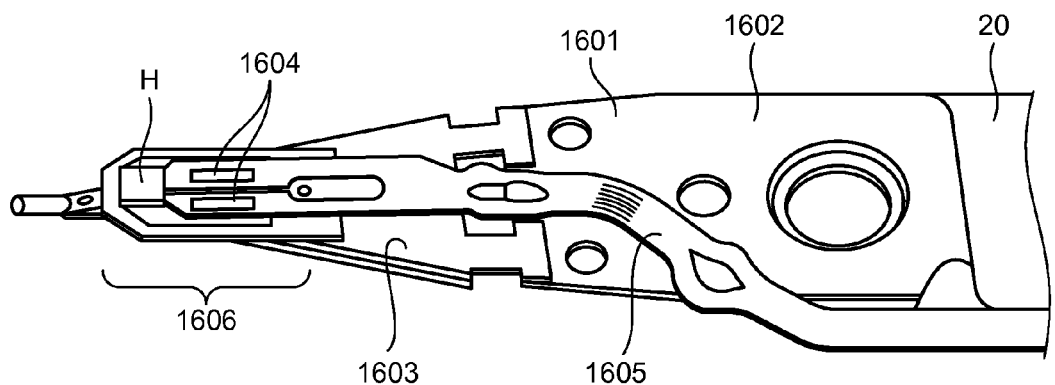
FIG. 17 is a diagram illustrating an example of a gimbal-driving actuator.

FIG. 17 is a diagram illustrating an example of a gimbal-driving actuator. As illustrated in FIG. 17, the gimbal-driving actuator has a suspension 1601 extended from the support arm 20, and supports the head H at the leading end of the suspension 1601.

The suspension 1601 has a base plate 1602 and a load beam 1603 joined to the base plate 1602. The gimbal-driving actuator further has a pair of piezoelectric elements 1604 and a flexure 1605 for applying voltage to the piezoelectric elements 1604.

The leading end of the flexure 1605 positioned at the leading end of the load beam 1603 constitutes a gimbal unit 1606 into which the head H and the piezoelectric elements 1604 are incorporated.

The piezoelectric elements 1604 are provided on the load beam 1603 and are driven (extended and contracted) by an input signal (voltage V or current I) applied via the flexure 1605 (wiring member). The piezoelectric elements 1604 displace the load beam 1603 in the track direction on the recording surface of the disc 101 according to the input signal. Accordingly, the piezoelectric elements 1604 position the head H attached to the load beam 1603 at the target position on the recording surface of the disc 101. The flexure 1605 is connected to the output unit 30 via the FPC 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disc device comprising:
 a plurality of recording surfaces on discs;
 a first head to be position-controlled over a first recording surface of the plurality of recording surfaces;
 a second head to be position-controlled over a second recording surface other than the first recording surface of the plurality of recording surfaces;
 a first actuator to drive the first head based on a first signal to position the first head at a target position of the recording surface;
 a second actuator to drive the second head based on the first signal;
 a third actuator to support the first actuator and the second actuator and drive the first head and the second head;
 a first control line to transmit the first signal to the first actuator;
 a second control line to transmit the first signal to the second actuator; and
 a filter to execute a filtering process to remove one or more resonances from the first signal based on sum of transfer functions, the one or more resonances being included in first transfer characteristics from the first signal transmitted via the first control line to response of the first head, the transfer functions being indicative of resonances included in second transfer characteristics from the first signal transmitted via the second control line to response of the first head, the filter being provided in the second control line.

2. The disc device of claim 1, wherein the filter performs a filtering process to remove all of the resonances from the first transfer characteristics.

3. The disc device of claim 1, wherein the filter performs a filtering process to remove some of the resonances from the first transfer characteristics.

4. The disc device of claim 1, wherein the second recording surface is opposite to the first recording surface of a disc with the first recording surface.

5. The disc device of claim 1, wherein
 the first actuator and the second actuator are three or more actuators, and
 the first control line and the second control line are included in three or more control lines that transmit the first signal individually to the three or more actuators.

6. The disc device of claim 1, wherein filter characteristics of the filter are expressed by the following equation:

$$F(s) = \{F_1(s) \cdot G_{b1}(s) + F_2(s) \cdot G_{b2}(s) + \ldots + F_n(s) \cdot G_{bn}(s)\} / \{G_{b1}(s) + G_{b2}(s) + \ldots + G_{bn}(s)\}$$

wherein $F(s)$ denotes the filter characteristics of the filter, $F_n(s)$ denotes filter characteristics for the each resonance included in the first transfer characteristics, $G_{bn}(s)$ denotes transfer functions for the each resonance included in the second transfer characteristics, and n denotes an integer of 1 or larger.

7. The disc device of claim 6, wherein, of the filter characteristics $F_n(s)$ for the each resonance included in the first transfer characteristics, the filter characteristics $F_n(s)$ for the resonances to be removed are set to 1.

8. A control method comprising:
 outputting, to a first control line connected to a first actuator that drives a first head to be position-controlled over a first recording surface of a plurality of recording surfaces of discs and a second control line connected to a second actuator that drives a second head to be position-controlled over a second recording surface other than the first recording surface of the plurality of recording surfaces, a first signal to position the first head at a target position of the recording surface; and
 executing a filtering process to remove one or more resonances from the first signal based on sum of transfer functions, the one or more resonances being included in first transfer characteristics from the first signal transmitted via the first control line to response of the first head, the transfer functions being indicative of resonances included in the second transfer characteristics from the first signal transmitted via the second control line to response of the first head.

9. The control method of claim 8, comprising subjecting the first signal transmitted via the second control line to a filtering process to remove all of the resonances from the first transfer characteristics.

10. The control method of claim 8, comprising subjecting the first signal transmitted via the second control line to a filtering process to remove some of the resonances from the first transfer characteristics.

11. The control method of claim 8, wherein the second recording surface is opposite to the first recording surface of a disc with the first recording surface.

12. The control method of claim 8, wherein
 the first actuator and the second actuator are three or more actuators, and
 the first control line and the second control line are included in three or more lines that transmit the first signal individually to the three or more actuators.

13. The control method of claim 8, wherein filter characteristics of the filter are expressed by the following equation:

$$F(s) = \{F_1(s) \cdot G_{b1}(s) + F_2(s) \cdot G_{b2}(s) + \ldots + F_n(s) \cdot G_{bn}(s)\} / \{G_{b1}(s) + G_{b2}(s) + \ldots + G_{bn}(s)\}$$

wherein $F(s)$ denotes the filter characteristics of the filter, $F_n(s)$ denotes filter characteristics for the each resonance included in the first transfer characteristics, $G_{bn}(s)$ denotes transfer functions for the each resonance included in the second transfer characteristics, and n denotes an integer of 1 or larger.

14. The control method of claim 13, wherein, of the filter characteristics $F_n(s)$ for the each resonance included in the first transfer characteristics, the filter characteristics $F_n(s)$ for the resonances to be removed are set to 1.

* * * * *